(12) United States Patent
Tsai

(10) Patent No.: US 10,516,831 B1
(45) Date of Patent: Dec. 24, 2019

(54) VEHICULAR IMAGE PICKUP DEVICE AND IMAGE CAPTURING METHOD

(71) Applicant: GETAC TECHNOLOGY CORPORATION, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/034,133

(22) Filed: Jul. 12, 2018

(51) Int. Cl.
*H04N 5/235* (2006.01)
*H04N 5/341* (2011.01)
*B60R 11/04* (2006.01)

(52) U.S. Cl.
CPC ........... *H04N 5/2353* (2013.01); *B60R 11/04* (2013.01); *H04N 5/2354* (2013.01); *H04N 5/341* (2013.01)

(58) Field of Classification Search
CPC .... H04N 5/2353; H04N 5/2354; H04N 5/341; B60R 11/04
See application file for complete search history.

(56) References Cited

U.S. PATENT DOCUMENTS

| | | | | |
|---|---|---|---|---|
| 5,818,528 A * | 10/1998 | Roth | ................... | G06K 7/10732 348/364 |
| 2009/0096898 A1 * | 4/2009 | Sambongi | ............... | H04N 5/202 348/254 |
| 2010/0092104 A1 * | 4/2010 | Klijn | .................... | H04N 1/4074 382/275 |
| 2011/0115898 A1 * | 5/2011 | Hikosaka | ............. | H04N 5/2352 348/81 |
| 2012/0188414 A1 * | 7/2012 | Ross | ...................... | H04N 5/357 348/241 |
| 2013/0182111 A1 | 7/2013 | Ogasawara | | |
| 2013/0332866 A1 * | 12/2013 | Johnson | ................. | H04N 5/232 715/764 |
| 2014/0072218 A1 * | 3/2014 | Kim | ......................... | G06T 5/40 382/170 |
| 2014/0307924 A1 | 10/2014 | Fillion et al. | | |
| 2014/0320695 A1 * | 10/2014 | Ozawa | ............... | H04N 5/35563 348/229.1 |
| 2014/0354859 A1 | 12/2014 | Noyes et al. | | |

(Continued)

OTHER PUBLICATIONS

Kerr, APEX—The Additive System of Photographic Exposure Issue 7, Aug. 2007 (Year 2007).

(Continued)

*Primary Examiner* — Amy R Hsu

(57) ABSTRACT

A vehicular image pickup device includes an image capturing unit, a fill light unit and a processing unit. The image capturing unit captures driving images. The fill light unit provides a fill light. The processing unit obtains a grayscale quantity distribution of pixels of the driving images on a plurality of grayscale levels. The processing unit numbers the pixels sequentially in the direction from the highest grayscale level to the lowest grayscale level according to the grayscale quantity distribution until the numbering reaches a predetermined number. The processing unit adjusts a fill light intensity of the fill light unit or a gain of the image capturing unit according to the grayscale level of the pixel whose number is the predetermined number.

22 Claims, 11 Drawing Sheets

(56) References Cited

U.S. PATENT DOCUMENTS

| | | | |
|---|---|---|---|
| 2016/0117975 A1* | 4/2016 | Kang | G09G 3/2003 345/694 |
| 2018/0041681 A1 | 2/2018 | Pope | |
| 2018/0047176 A1* | 2/2018 | Toyoda | G06T 5/50 |
| 2018/0110493 A1* | 4/2018 | Golan | G01T 1/02 |
| 2019/0202372 A1 | 7/2019 | Tsai | |
| 2019/0208102 A1 | 7/2019 | Tsai | |

OTHER PUBLICATIONS

U.S. Patent Office, Office Action, U.S. Appl. No. 16/034,118, dated Jul. 23, 2019, U.S.

U.S. Appl. No. 16/034,118, filed Jul. 12, 2018, USPTO.

* cited by examiner

VEHICULAR IMAGE PICKUP DEVICE AND IMAGE CAPTURING METHOD

BACKGROUND OF THE INVENTION

Field of the Invention

The present disclosure relates to image capturing technology and, more particularly, to a vehicular image pickup device and an image capturing method.

Description of the Prior Art

Image pickup devices are capable of recording images and thus have wide application, including ones installed at entrances and exits of buildings which require surveillance, to assist with tasks, such as conducting an investigation, preserving and collecting evidence.

Normally, conventional image pickup devices are each installed at a specific point to capture images within its image capturing radius according to an invariable operation model. However, if a conventional image pickup device is mounted on a moving object, for example, a vehicle, image quality of images captured by the image pickup device deteriorates, depending on the speed of the moving object. Furthermore, accuracy of ensuing recognition of the captured images is affected.

SUMMARY OF THE INVENTION

In an embodiment, an image capturing method comprises the steps of: capturing a driving image by an image capturing unit; obtaining a grayscale quantity distribution of a plurality of pixels of the driving image on a plurality of grayscale levels; numbering the pixels sequentially in a direction from a highest grayscale level to a lowest grayscale level among the grayscale levels according to the grayscale quantity distribution until the numbering reaches a predetermined number; and adjusting a fill light intensity of a fill light unit or a gain of the image capturing unit according to the grayscale level associated with the pixel numbered with the predetermined number.

In an embodiment, a vehicular image pickup device comprises an image capturing unit, a fill light unit and a processing unit. The image capturing unit captures driving images. The fill light unit provides a fill light. The processing unit obtains a grayscale quantity distribution of a plurality of pixels of the driving images on a plurality of grayscale levels. The processing unit numbers the pixels sequentially in the direction from the highest grayscale level to the lowest grayscale level among the grayscale levels according to the grayscale quantity distribution until the numbering reaches a predetermined number. The processing unit adjusts a fill light intensity of the fill light unit or a gain of the image capturing unit according to the grayscale level of the pixel whose number is the predetermined number.

In conclusion, a vehicular image pickup device and an image capturing method in the embodiments of the present disclosure adjust a fill light intensity or a gain according to a grayscale quantity distribution of driving images so as to obtain driving images with appropriate brightness, and fine-tune a shutter speed, a fill light intensity or a gain according to a frequency spectrum of the driving images or a brightness distribution of an object image so as to augment the detailed performance of the driving images. Furthermore, the vehicular image pickup device and the image capturing method in the embodiments of the present disclosure dispense with the need to wait for feedback from a back-end system and thus are capable of confirming the image quality of the driving images and performing fine-tuning operation instantly; hence, the driving images of enhanced image quality can be quickly obtained.

Fine structures and advantages of the present disclosure are described below with reference to preferred embodiments of the present disclosure to enable persons skilled in the art to gain insight into the technical features of the present disclosure and implement the present disclosure accordingly. Persons skilled in the art can easily understand the objectives and advantages of the present disclosure by making reference to the disclosure contained in the specification, the claims, and the drawings.

DETAILED DESCRIPTION OF THE EMBODIMENTS

Figure 1:
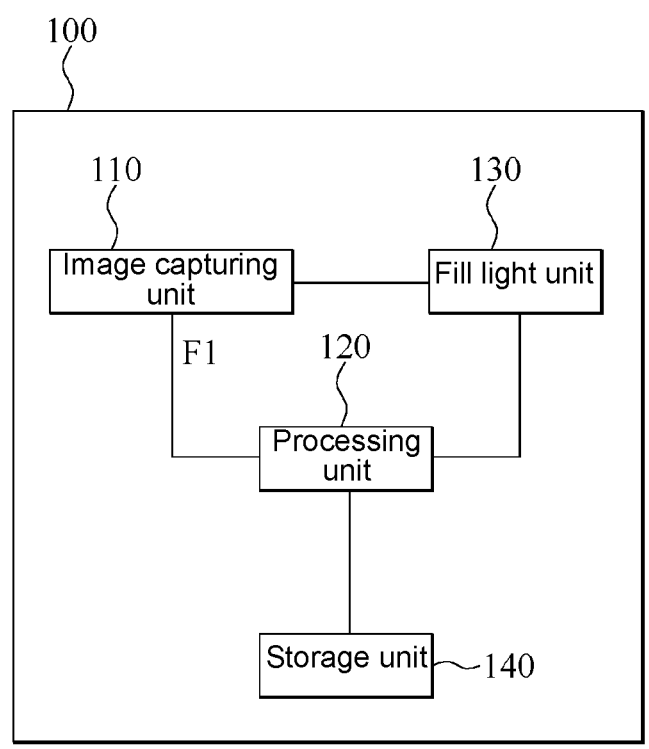
FIG. 1 is a block diagram of a vehicular image pickup device according to an embodiment of the present disclosure.

FIG. 1 is a block diagram of a vehicular image pickup device 100 according to an embodiment of the present disclosure. Referring to FIG. 1, in general, the vehicular image pickup device 100 is mounted on a means of transport and adapted to capture and record a driving image F1. In some embodiment aspects, the means of transport is a car or a motorcycle, but the present disclosure is not limited thereto. Any appropriate means of transport, which is suitable for use with the vehicular image pickup device 100, is applicable to the present disclosure.

In an embodiment, the vehicular image pickup device 100 comprises an image capturing unit 110 and a processing unit 120. The processing unit 120 is coupled to the image capturing unit 110. The vehicular image pickup device 100 further comprises a fill light unit 130. The fill light unit 130 is coupled to the image capturing unit 110 and the processing unit 120. The image capturing unit 110 captures driving images F1. The fill light unit 130 outputs a fill light, i.e., a supplementary light, so as to assist with the image-capturing function of the image capturing unit 110.

In some embodiment aspects, the image capturing unit 110 comprises an assembly of lenses and light-sensing components. The light-sensing components include, for example, a complementary metal-oxide semiconductor (CMOS) and a charge-coupled device (CCD). The fill light unit 130 is, for example, implemented by a light-emitting diode (LED), an infrared LED (IR LED), a halogen lamp, or a laser source, but the present disclosure is not limited thereto.

The processing unit 120 controls and adjusts the operation of the image capturing unit 110 and/or the fill light unit 130 according to the image capturing method in any embodiment of the present disclosure to enhance the image quality of the driving images F1 captured by the image capturing unit 110.

In some embodiment aspects, the processing unit 120 is, for example, a system-on-a-chip (SoC), a central processing unit (CPU), a microcontroller (MCU), or an application-specific integrated circuit (ASIC).

Figure 2:
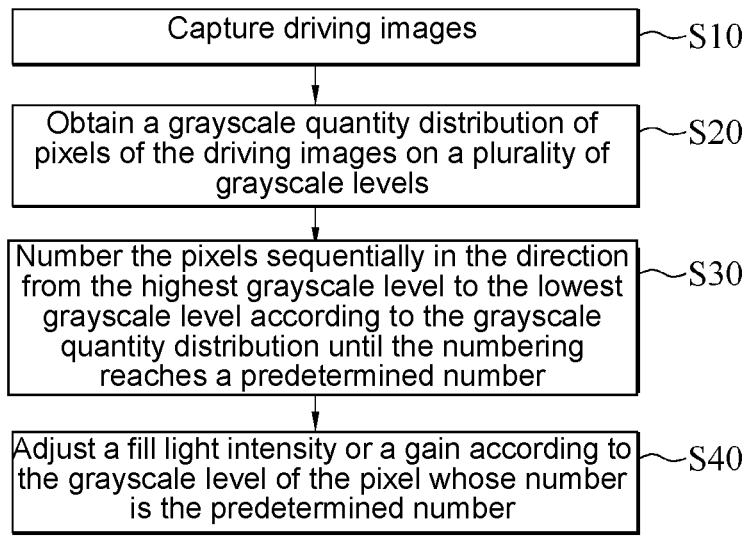
FIG. 2 is a schematic view of a process flow of an image capturing method according to an embodiment of the present disclosure.

FIG. 2 is a schematic view of a process flow of an image capturing method according to an embodiment of the present disclosure. Referring to FIG. 1 and FIG. 2, using an embodiment of the image capturing method, the processing unit 120 instructs the image capturing unit 110 to capture driving images F1 (step S10). Afterward, the processing unit 120 makes a histogram of the driving images F1 by image integration and thus obtains a grayscale quantity distribution of pixels of the driving images F1 on a plurality of grayscale levels (step S20). The processing unit 120 numbers the pixels sequentially in the direction from the highest grayscale level to the lowest grayscale level among the grayscale levels according to the grayscale quantity distribution obtained in step S20 until the numbering reaches a predetermined number (step S30). Afterward, the processing unit 120 adjusts a fill light intensity of the fill light unit 130 or a gain of the image capturing unit 110 according to the grayscale level of the pixel whose number is the predetermined number (step S40) such that the highest brightness of the driving images F1 can be adjusted to a reasonable range without becoming too bright or too dim.

In an embodiment of step S10, the image capturing unit 110 captures the driving images F1 with a global shutter, but the present disclosure is not limited thereto. In a variant embodiment of step S10, the image capturing unit 110 captures the driving image F1 with a rolling shutter. Furthermore, the image capturing unit 110 captures the driving images F1 at a predetermined shutter speed. In some embodiment aspects, the predetermined shutter speed ranges from $1/1000$ to $1/100000$ per second.

In some embodiments, each driving image F1 comprises a plurality of pixels. The pixels each display a grayscale according to a grayscale level in a plurality of grayscale levels. Hence, how the driving image F1 looks depends on the grayscales displayed by the pixels and their locations.

In some embodiment aspects, the driving image F1 consists of 1280*720 pixels, but the present disclosure is not limited thereto. In a variant embodiment, the driving image F1 consists of 360*240 pixels, 1920*1080 pixels, or any display standard-complying number of pixels.

In some embodiment aspects, the grayscale levels are in the number of 256, for example, from grayscale level 0 to grayscale level 255, with grayscale level 0 denoting the least brightness, and grayscale level 255 denoting the highest brightness, but the present disclosure is not limited thereto. In a variant embodiment, the number of the grayscale levels depends on the performance of the image capturing unit 110. For instance, the image capturing unit 110 comprises an analog-to-digital conversion circuit. If the analog-to-digital conversion circuit operates on a 10-bit basis, the image capturing unit 110 provides performance of 1024 (i.e., $2^{10}$) grayscale levels. The other cases are inferred by analogy.

In some embodiments, if an object is within an image capturing radius of the vehicular image pickup device 100, the driving image F1 captured by the image capturing unit 110 includes the object image M1.

In an embodiment of step S30, the predetermined number equals the number of pixels generally occupied by the object image M1 in the driving images F1. In some embodiment aspects, if the object image M1 is an image of a license plate, the predetermined number ranges from 1000 to 3000 or ranges from 2000 to 3000, but the present disclosure is not limited thereto. In a variant embodiment, the predetermined number depends on the number of pixels which must be occupied by the image of the license plate in order to correctly recognize every country's license plates and sizes thereof.

In general, the object image M1 in the driving image F1 captured in the presence of an appropriate fill light of the fill light unit 130 must has the highest brightness, whereas the background image (i.e., the other part of the driving image F1) has relatively low brightness. Therefore, the pixels displaying the object image M1 must be associated with the relatively high grayscale levels in the grayscale quantity distribution, whereas the pixels displaying the background image must be associated with the relatively low grayscale levels in the grayscale quantity distribution. Therefore, the processing unit 120 numbers the pixels sequentially in the direction from the highest grayscale level to the lowest grayscale level so as to identify the lowest grayscale level associated with the pixels displaying the object image M1 and thus confirm whether exposure level of the driving image F1 is appropriate.

For instance, in an embodiment, given 256 grayscale levels and a predetermined number 1000, the processing unit 120 numbers pixels sequentially in the direction from grayscale level 255 to grayscale level 0, that is, numbers the pixels at grayscale level 255, the pixels at grayscale level 254, the pixels at grayscale level 253, and so forth. The aforesaid pixel numbering process stops as soon as it reaches the predetermined number 1000. In a variant embodiment, the aforesaid pixel numbering process is accompanied by the cumulative counting of the pixels numbered and stops as soon as the count reaches the predetermined number 1000.

Figure 3:
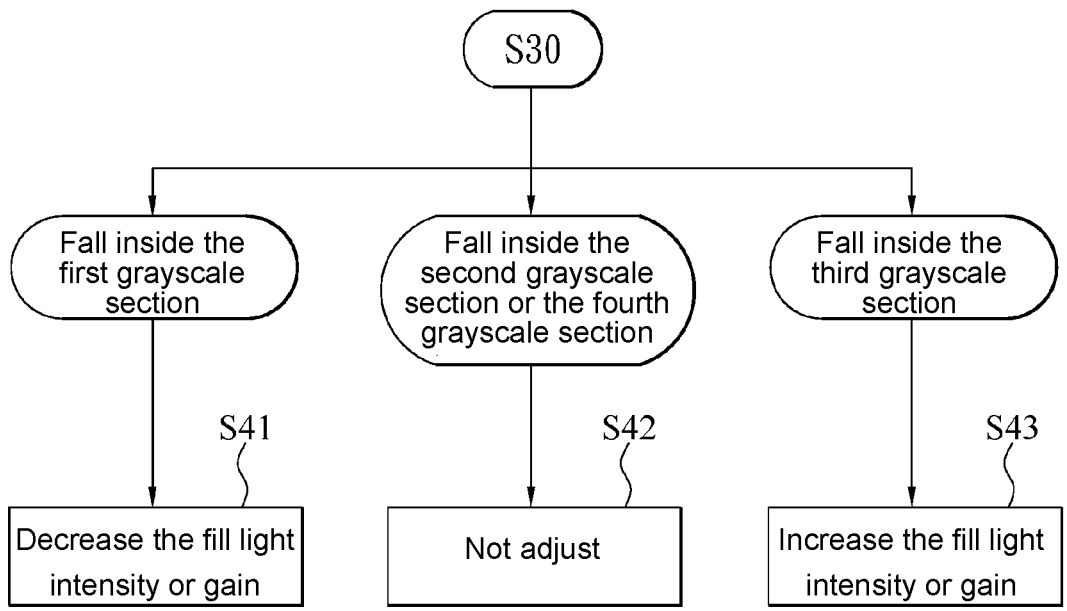
FIG. 3 is a schematic view of a process flow of step S40 in FIG. 2 according to an embodiment of the present disclosure.

FIG. 3 is a schematic view of a process flow of step S40 in FIG. 2 according to an embodiment of the present disclosure. Referring to FIG. 1 through FIG. 3, in an embodiment of step S40, the grayscale levels are divided into a plurality of grayscale sections. The processing unit 120 performs adjustment operations by identifying the grayscale section which the grayscale level associated with the pixels numbered with the predetermined number falls inside.

The description below is exemplified by 256 grayscale levels. The grayscale levels are divided into grayscale sections, namely a first grayscale section, a second grayscale section, a third grayscale section and a fourth grayscale section, sequentially in the direction from the highest grayscale level 255 to the lowest grayscale level 0. The grayscale level 255 to grayscale level 200 are defined as the first grayscale section. The grayscale level 199 to grayscale level 150 are defined as the second grayscale section. The grayscale level 149 to grayscale level 100 are defined as the third grayscale section. The grayscale level 99 to grayscale level 0 are defined as the fourth grayscale section. The exemplary relationship between the grayscale sections and adjustment operations are shown in Table 1 below.

TABLE 1 relationship between grayscale section and adjustment operation

| Grayscale section | first Grayscale section | Second Grayscale section | Third Grayscale section | Fourth Grayscale section |
|---|---|---|---|---|
| Grayscale level | 255~200 | 199~150 | 149~100 | 99~0 |
| Brightness status | Too bright | Appropriate | Too dim | No object image |
| Adjustment operation | Decrease fill light intensity or gain | Nil | Increase fill light intensity or gain | Nil |

If the grayscale level associated with the pixel numbered with the predetermined number falls inside the first grayscale section, it means that the object image M1 is currently too bright. Therefore, the processing unit 120 decreases the fill light intensity of the fill light unit 130 or the gain of the image capturing unit 110 (step S41) in order to correct the problem.

If the grayscale level associated with the pixel numbered with the predetermined number falls inside the second grayscale section, it means that brightness of the object image M1 is currently appropriate. Therefore, the processing unit 120 does not adjust the fill light intensity of the fill light unit 130 or gain of the image capturing unit 110 (step S42).

If the grayscale level associated with the pixel numbered with the predetermined number falls inside the third grayscale section, it means that the object image M1 is currently too dim. Therefore, the processing unit 120 increases the fill light intensity of the fill light unit 130 or the gain of the image capturing unit 110 (step S43) in order to correct the problem.

If the grayscale level associated with the pixel numbered with the predetermined number falls inside the fourth grayscale section, it means that the object image M1 is absent from the driving image F1. Therefore, the processing unit 120 does not perform any adjustment operation but proceeds to perform step S42.

Figure 4:
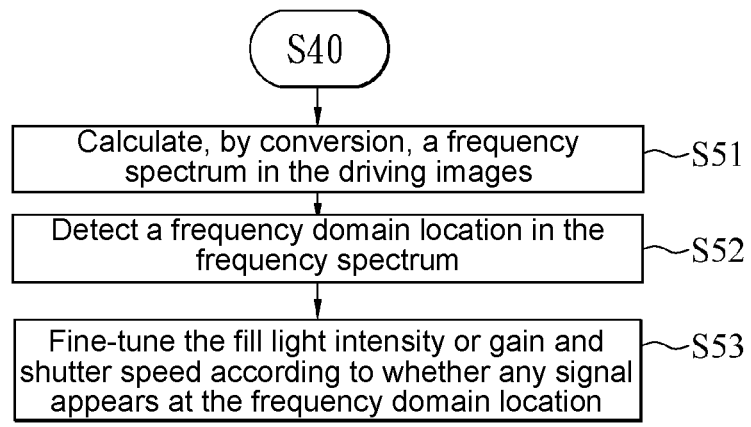
FIG. 4 is a schematic view of a process flow after step S40 of the image capturing method according to an embodiment of the present disclosure.
Figure 5:
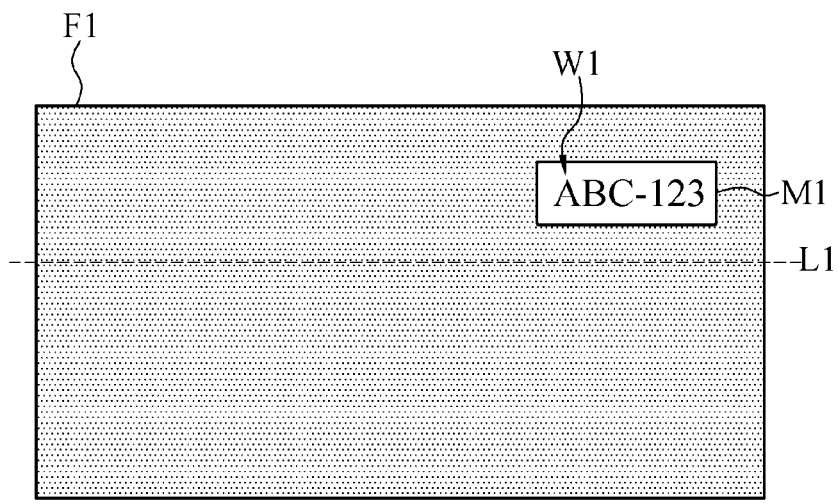
FIG. 5 is a schematic view of a driving image according to an embodiment of the present disclosure.

FIG. 4 is a schematic view of a process flow after step S40 of the image capturing method according to an embodiment of the present disclosure. FIG. 5 is a schematic view of a driving image according to an embodiment of the present disclosure. Referring to FIG. 1 through FIG. 5, in an embodiment of the image capturing method, after step S40, the processing unit 120 performs frequency domain conversion on a driving image F1 so as to calculate, by conversion, a frequency spectrum in the driving image F1 (step S51). Afterward, the processing unit 120 detects a frequency domain location in the frequency spectrum (step S52) and fine-tunes the gain of the image capturing unit 110 or the fill light intensity of the fill light unit 130 and the shutter speed of the image capturing unit 110 according to whether any signal appears at the frequency domain location (step S53), so as to further optimize the image quality of the images captured by the vehicular image pickup device 100 by the aforesaid fine-tuning operations.

In an embodiment of step S51, the frequency domain conversion is implemented by Fourier transform.

In an embodiment of step S52, the object image M1 comprises a plurality of character images W1. The processing unit 120 defines a straight line L1 penetrating the driving images F1 and thus obtains a frequency domain location according to the number of pixels on the straight line L1 penetrating the driving images F1 and the number of pixels displaying the character images W1 and aligned in the same direction as the straight line L1. In some embodiment aspects, the frequency domain location is a high frequency location in the frequency spectrum.

The description below is exemplified by the driving image F1 with an image format of 1280*720. If the driving image F1 has an image format of 1280*720, it means that the driving image F1 has 1280 pixels on the horizontal axis (i.e., X-axis) and 720 pixels on the vertical axis (i.e., Y-axis), and thus the driving image F1 consists of 1280*720 pixels. If the processing unit 120 defines the straight line L1 which runs along the horizontal axis of the driving image F1, the straight line L1 must penetrate 1280 pixels in the driving image F1. The number of pixels (along the straight line L1) displaying the character images W1 equals the number (say, 3~10) of pixels required for recognition of the character images W1. In this regard, the description below is exemplified by three pixels. Therefore, the processing unit 120 detects 3/1280 frequency domain locations, but the present disclosure is not limited thereto. In a variant embodiment, the straight line L1 penetrating the driving image F1 runs along the vertical axis of the driving image F1 or in any other appropriate direction.

Figure 6:
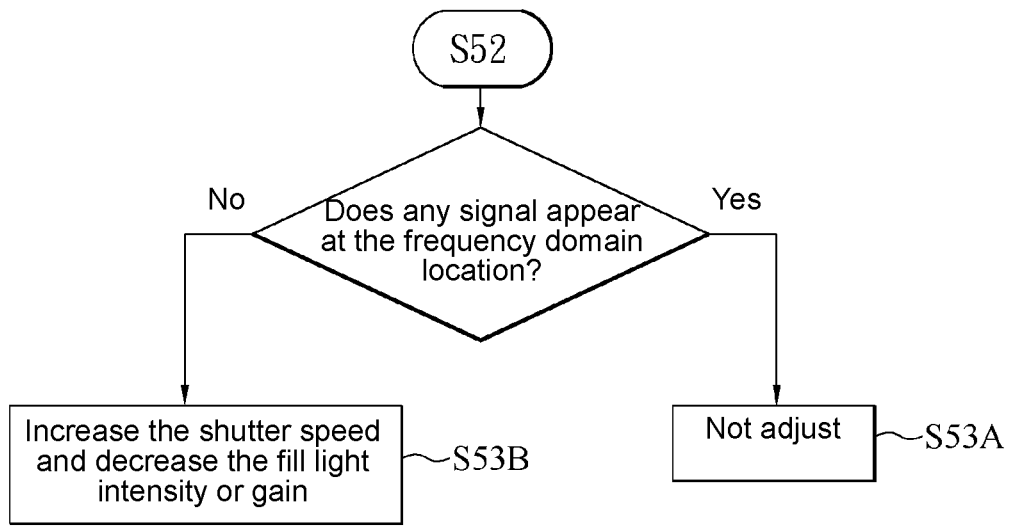
FIG. 6 is a schematic view of a process flow of step S53 in FIG. 4 according to an embodiment of the present disclosure.

FIG. 6 is a schematic view of a process flow of step S53 in FIG. 4 according to an embodiment of the present disclosure. Referring to FIG. 1 through FIG. 6, in an embodiment of step S53, if in step S52 the processing unit 120 detects that a signal appears at the frequency domain location, the processing unit 120 determines that the driving image F1 is sharp enough, and thus the processing unit 120 does not adjust the gain and shutter speed of the image capturing unit 110 and the fill light intensity of the fill light unit 130 (step S53A). If in step S52 the processing unit 120 does not detect any signal at the frequency domain location, the processing unit 120 determines that the driving image F1 is not sharp enough, that is, is blurred, and thus the processing unit 120 increases the shutter speed of the image capturing unit 110 and decreases either the gain of the image capturing unit 110 or the fill light intensity of the fill light unit 130 (step S53B), so as to ensure that the driving image F1 captured by the image capturing unit 110 after the fine-tuning operations will have sufficient brightness and sharpness.

In some embodiments, the processing unit 120 performs step S51 through step S53 repeatedly to effectuate fine-tuning repeatedly, and it is only when the processing unit 120 determines that the driving image F1 has sufficient high spectrum responses that the processing unit 120 stops performing the fine-tuning operations of step S51 through step S53.

In conclusion, in step S51 through step S53, the processing unit 120 confirms whether the driving image F1 lacks a high frequency signal by frequency domain conversion and thus confirms the image quality of the driving image F1 to therefore enable quick feedback and perform fine-tuning accordingly, so as to obtain the driving images F1 with enhanced image quality quickly.

Figure 7:
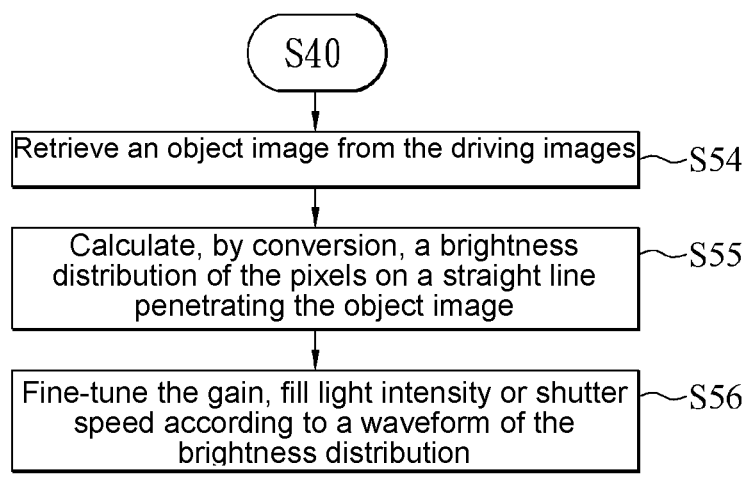
FIG. 7 is a schematic view of a process flow after step S40 of the image capturing method according to an embodiment of the present disclosure.
Figure 8:
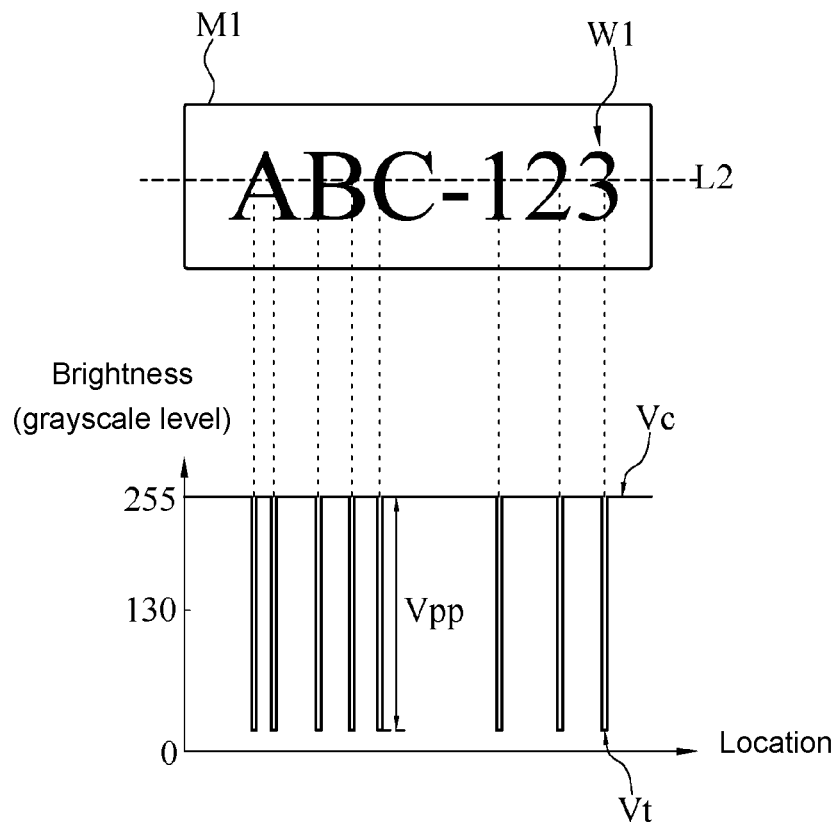
FIG. 8 is a schematic view of an object image and its brightness distribution according to an embodiment of the present disclosure.

FIG. 7 is a schematic view of a process flow after step S40 of the image capturing method according to an embodiment of the present disclosure. FIG. 8 is a schematic view of an object image and its brightness distribution according to an embodiment of the present disclosure. Referring to FIG. 7 and FIG. 8, using an embodiment of the image capturing method, after step S40, the processing unit 120 retrieves the object image M1 from the driving images F1 (step S54), so as to calculate, by conversion, a brightness distribution of the pixels on a straight line L2 penetrating the object image M1 (step S55). Afterward, the processing unit 120 fine-tunes the gain of the image capturing unit 110, the fill light intensity of the fill light unit 130 or the shutter speed of the image capturing unit 110 according to a waveform of the brightness distribution (step S56), so as to further optimize the image quality of the images captured by the vehicular image pickup device 100 by the aforesaid fine-tuning operations.

In some embodiments, the processing unit 120 performs step S54 through step S56 repeatedly to effectuate fine-tuning repeatedly, and it is only when the processing unit 120 determines that the driving image F1 has sufficient image quality that the processing unit 120 stops performing the fine-tuning operations of step S54 through step S56.

In an embodiment of step S54, the processing unit 120 retrieves the object image M1 from the driving images F1 by image processing technology, for example, image division.

In an embodiment of step S55, the processing unit 120 defines a straight line L2 penetrating the object image M1 and thus calculates, by conversion, a brightness distribution of brightness against location, according to all the pixels on the straight line L2 and their locations. In some embodiment aspects, the processing unit 120 defines the straight line L2 along the horizontal axis of the object image M1, but the present disclosure is not limited thereto. In a variant embodiment, the straight line L2 penetrating the object image M1 runs along the vertical axis of the object image M1 or in any other appropriate direction. Furthermore, the object image M1 comprises a plurality of character images W1, and the straight line L2 penetrates the character images W1.

Figure 9:
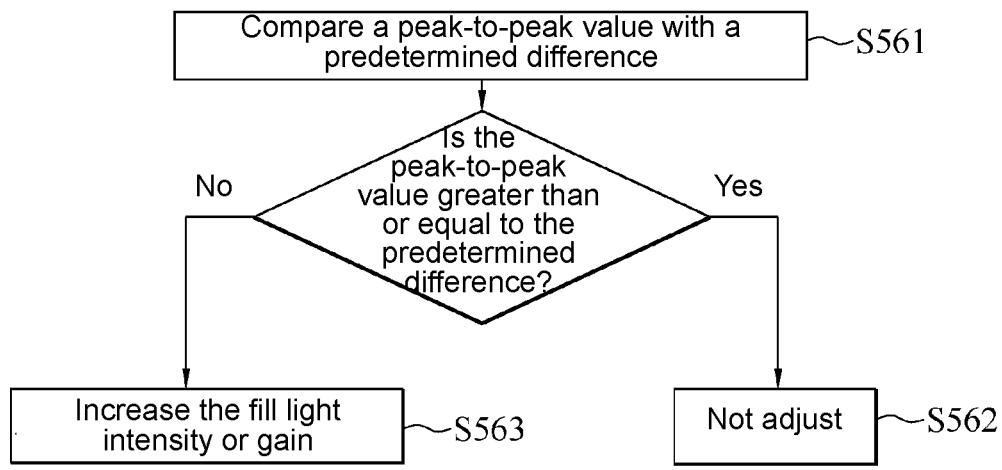
FIG. 9 is a schematic view of a process flow of step S56 in FIG. 7 according to an embodiment of the present disclosure.

FIG. 9 is a schematic view of a process flow of step S56 in FIG. 7 according to an embodiment of the present disclosure. Referring to FIG. 7 through FIG. 9, in an embodiment of step S56, the processing unit 120 performs the fine-tuning step according to a peak-to-peak value Vpp of the waveform of the brightness distribution calculated in step S55. The peak-to-peak value Vpp equals the difference between crest Vc and trough Vt of the waveform of the brightness distribution. Therefore, the processing unit 120 compares the peak-to-peak value Vpp of the waveform with a predetermined difference (step S561). If the peak-to-peak value Vpp is greater than or equal to the predetermined difference, the processing unit 120 determines that the contrast of the object image M1 is sufficient and thus does not adjust the gain of the image capturing unit 110, the fill light intensity of the fill light unit 130 and the shutter speed of the image capturing unit 110 (step S562). If the peak-to-peak value Vpp is less than the predetermined difference, the processing unit 120 determines that the contrast of the object image M1 is insufficient and enables the fill light unit 130 to increase its fill light intensity or enables the image capturing unit 110 to increase its gain (step S563), so as to increase the contrast of the object image M1 in the driving image F1 captured after the fine-tuning step.

In some embodiments aspects, the unit of measurement of the brightness in the brightness distribution is a grayscale level. Furthermore, the predetermined difference ranges from 90 grayscale levels to 110 grayscale levels. For instance, the predetermined difference is 100 grayscale levels, but the present disclosure is not limited thereto.

Figure 10:
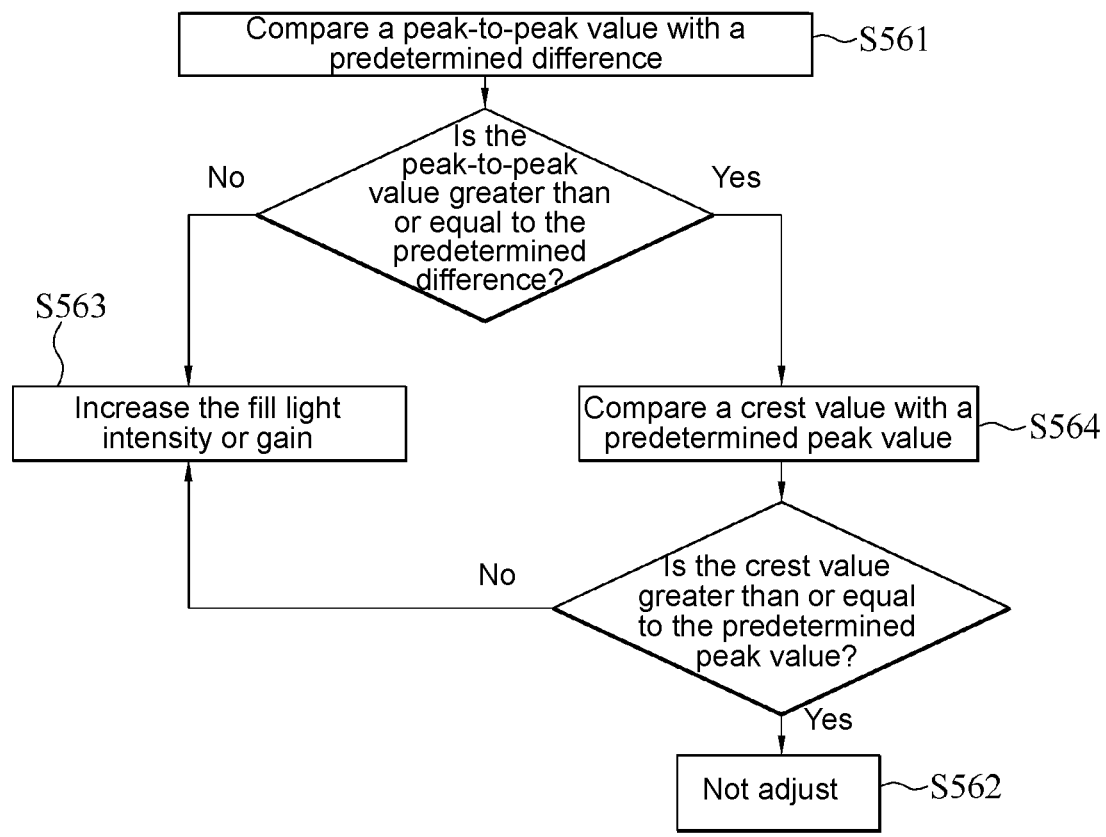
FIG. 10 is a schematic view of a process flow of step S56 in FIG. 7 according to an embodiment of the present disclosure.
Figure 11:
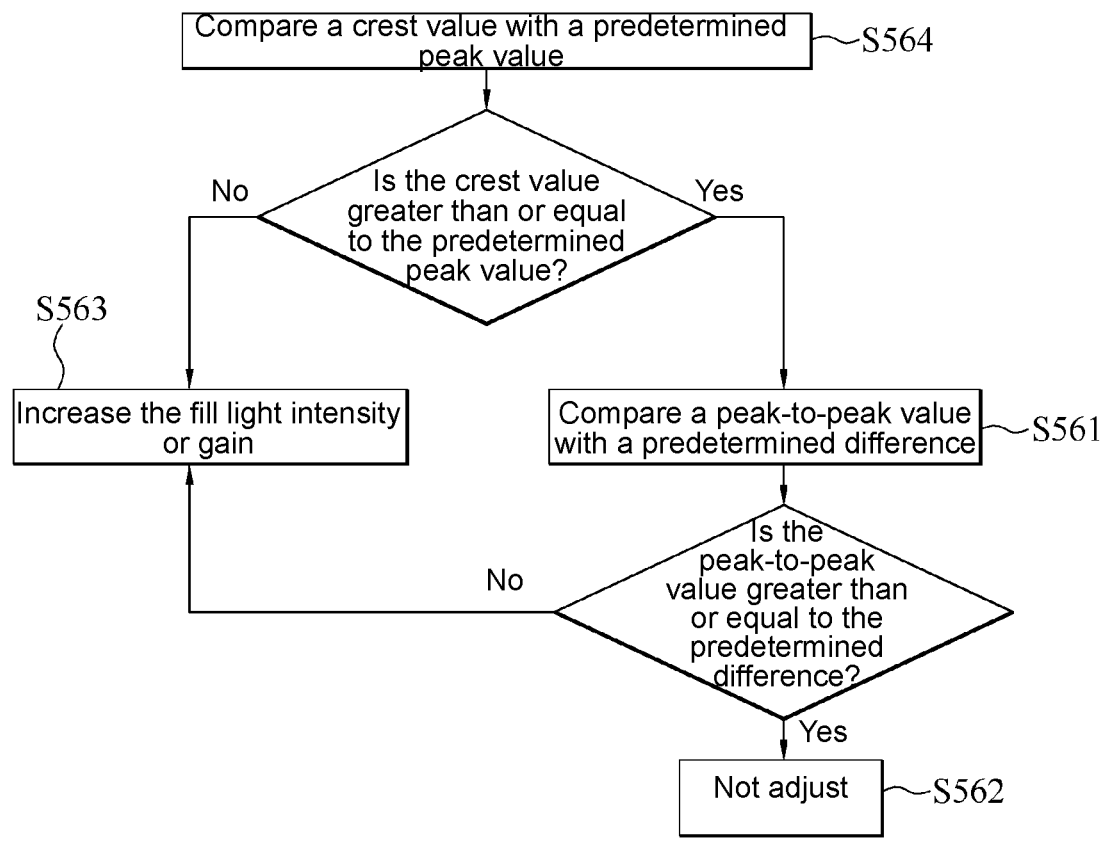
FIG. 11 is a schematic view of a process flow of step S56 in FIG. 7 according to an embodiment of the present disclosure.

FIG. 10 is a schematic view of a process flow of step S56 in FIG. 7 according to an embodiment of the present disclosure. Referring to FIG. 10, in an embodiment of step S56, in addition to the peak-to-peak value Vpp, the processing unit 120 performs fine-tuning according to a crest value. In an embodiment aspect, after performing step S561 and determining that the peak-to-peak value Vpp is greater than or equal to the predetermined difference, the processing unit 120 compares a crest value of the waveform with a predetermined peak value (step S564). If the comparison carried out in step S564 shows that the crest value is greater than or equal to the predetermined peak value, it means that the object image M1 does not have overly low brightness (i.e., is not too dim), and thus the processing unit 120 proceeds to perform step S562, that is, the processing unit 120 does not perform adjustment. Conversely, if the comparison carried out in step S564 shows that the crest value is less than the predetermined peak value, it means that the object image M1 is likely to have overly low brightness (i.e., is likely to be too dim), and thus the processing unit 120 performs step S563 in order to increase the brightness of the object image M1, but the present disclosure is not limited thereto. FIG. 11 is a schematic view of a process flow of step S56 in FIG. 7 according to an embodiment of the present disclosure. Referring to FIG. 11, in another embodiment aspect, the processing unit 120 performs step S564 before step S561. Afterward, if the comparison carried out in step S564 shows that the crest value is greater than or equal to the predetermined peak value, the processing unit 120 proceeds to perform the step S561 of comparing the peak-to-peak value Vpp with a predetermined difference and then proceeds to perform step S562 or step S563 according to the comparison result of step S561. If the comparison carried out in step S564 shows that the crest value is less than the predetermined peak value, the processing unit 120 proceeds to perform step S563.

Figure 12:
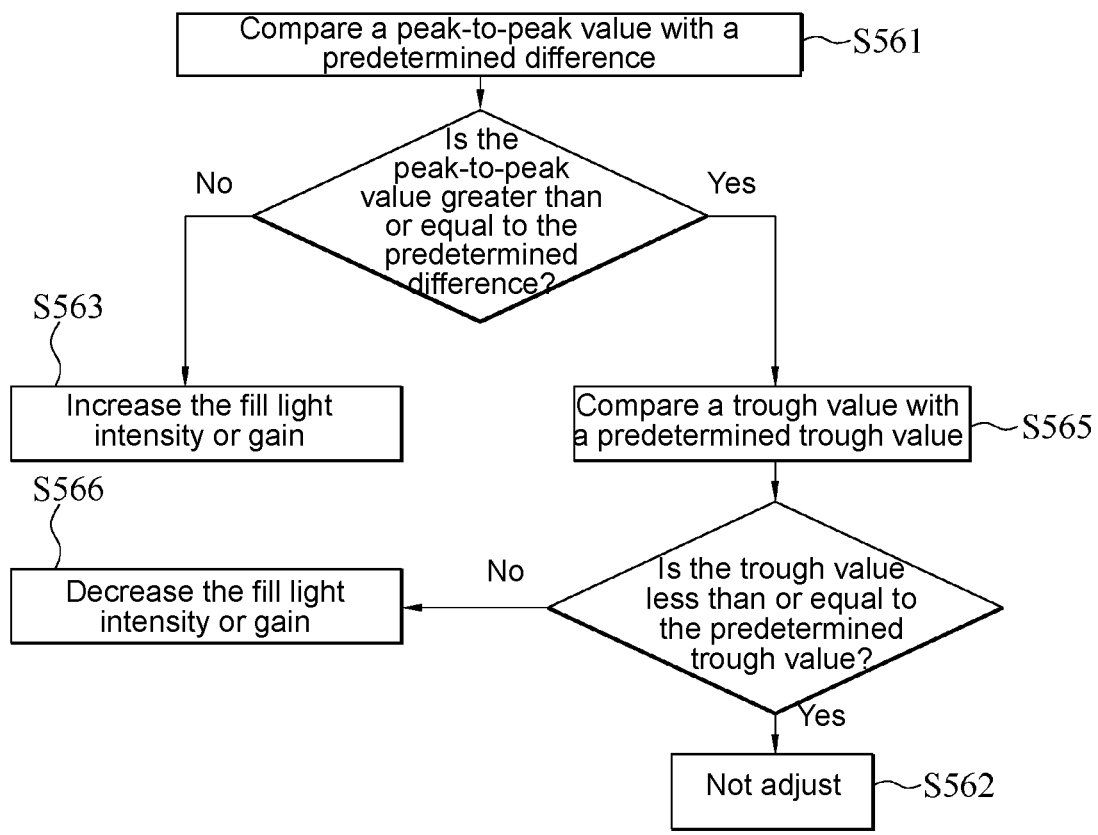
FIG. 12 is a schematic view of a process flow of step S56 in FIG. 7 according to an embodiment of the present disclosure.
Figure 13:
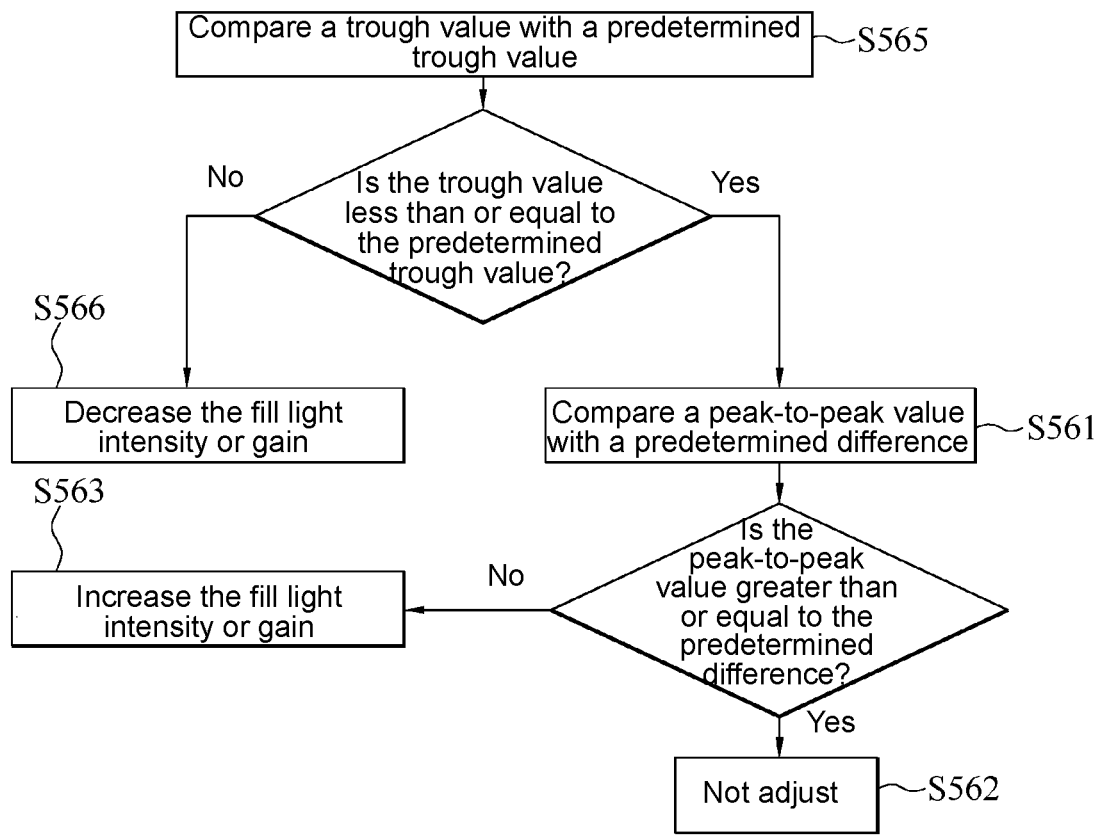
FIG. 13 is a schematic view of a process flow of step S56 in FIG. 7 according to an embodiment of the present disclosure.

FIG. 12 is a schematic view of a process flow of step S56 in FIG. 7 according to an embodiment of the present disclosure. Referring to FIG. 12, in an embodiment of step S56, in addition to the peak-to-peak value Vpp, the processing unit 120 performs fine-tuning according to a trough value. In an embodiment aspect, after performing step S561 and determining that the peak-to-peak value Vpp is greater than or equal to the predetermined difference, the processing unit 120 compares a trough value of the waveform with a predetermined trough value (step S565). If the comparison carried out in step S565 shows that the trough value is less than or equal to the predetermined trough value, it means that the object image M1 does not have overly high brightness (i.e., is not too bright), and thus the processing unit 120 proceeds to perform step S562, that is, the processing unit 120 does not perform adjustment. Conversely, if the comparison carried out in step S565 shows that the trough value is greater than the predetermined trough value, it means that the object image M1 is likely to have overly high brightness (i.e., is likely to be too bright), and thus the processing unit 120 enables the fill light unit 130 to decrease its fill light intensity or enables the image capturing unit 110 to decrease its gain (step S566), but the present disclosure is not limited thereto. FIG. 13 is a schematic view of a process flow of step S56 in FIG. 7 according to an embodiment of the present disclosure. Referring to FIG. 13, in another embodiment aspect, the processing unit 120 performs step S565 before step S561. Afterward, if the comparison carried out in step S565 shows that the trough value is less than or equal to the predetermined trough value, the processing unit 120 proceeds to perform the step S561 of comparing the peak-to-peak value Vpp with a predetermined difference and then proceeds to perform step S562 or step S563 according to the comparison result of step S561. If the comparison carried out in step S565 shows that the trough value is greater than the predetermined trough value, the processing unit 120 proceeds to perform step S566.

In some embodiment aspects, the predetermined peak value ranges from grayscale level 120 to grayscale level 140. Furthermore, the predetermined trough value ranges from grayscale level 120 to grayscale level 140. In some embodiment aspects, the predetermined peak value is equal to the predetermined trough value. For instance, the predetermined peak value and the predetermined trough value are grayscale level 130, but the present disclosure is not limited thereto.

Figure 14:
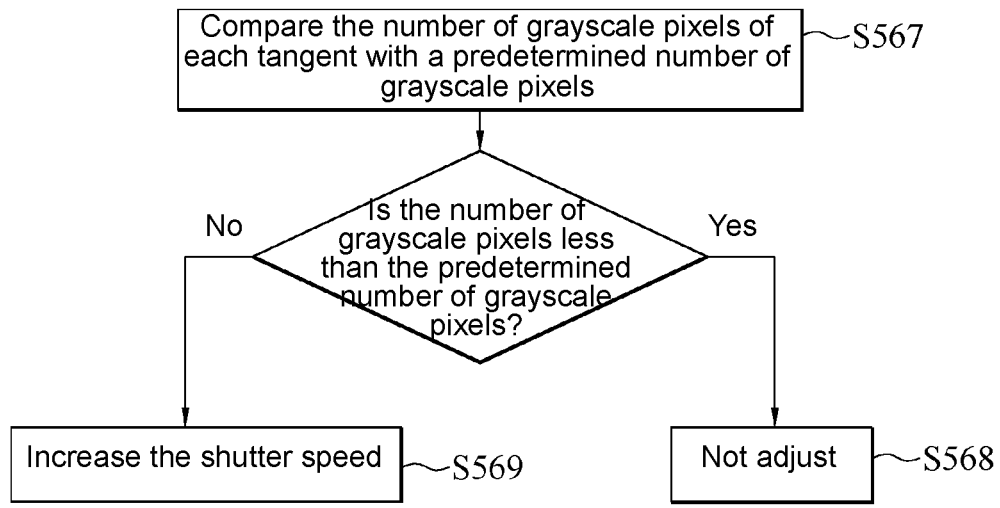
FIG. 14 is a schematic view of a process flow of step S56 in FIG. 7 according to an embodiment of the present disclosure.
Figure 15:
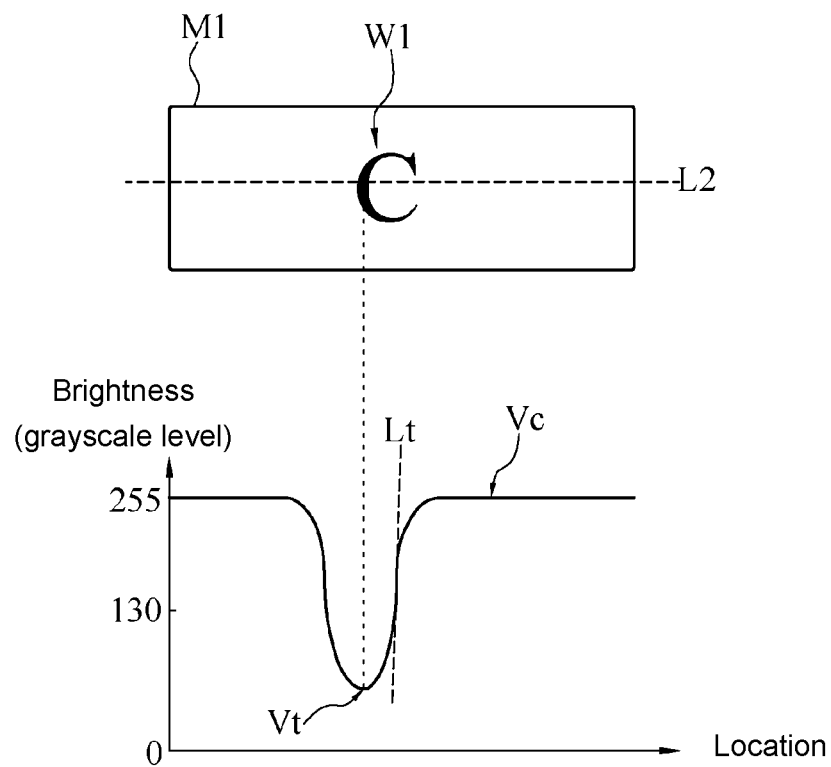
FIG. 15 is a schematic view of an object image and its brightness distribution according to an embodiment of the present disclosure.
Figure 16:
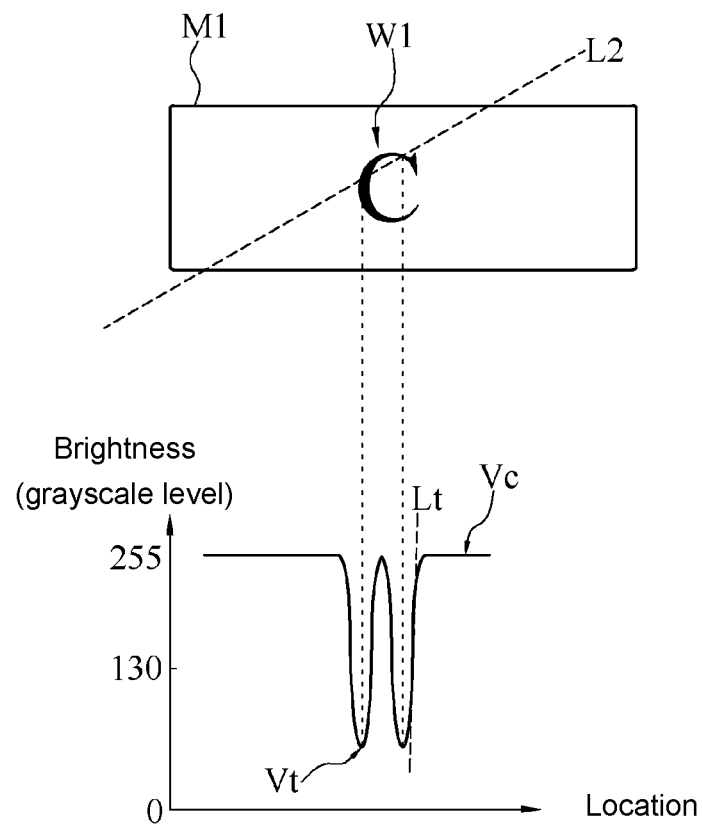
FIG. 16 is a schematic view of an object image and its brightness distribution according to an embodiment of the present disclosure.

FIG. 14 is a schematic view of a process flow of step S56 in FIG. 7 according to an embodiment of the present disclosure. FIG. 15 is a schematic view of an object image and its brightness distribution according to an embodiment of the present disclosure. FIG. 16 is a schematic view of an object image and its brightness distribution according to an embodiment of the present disclosure. Referring to FIG. 7, FIG. 14 through FIG. 16, in an embodiment of step S56, the processing unit 120 performs fine-tuning according to the number of grayscale pixels of each tangent Lt of the waveform of the brightness distribution calculated in step S55. The number of grayscale pixels of each tangent Lt equals the transition slope in transiting from crest Vc to trough Vt or the transition slope in transiting from trough Vt to crest Vc. In some embodiment aspects, the unit of measurement of the brightness in the brightness distribution is a grayscale level, and thus the unit of measurement of the number of grayscale pixels of the tangent is: grayscale level/number of pixels.

The processing unit 120 compares the number of grayscale pixels of each tangent with a predetermined number of grayscale pixels (step S567). If the number of grayscale pixels of each tangent is less than the predetermined number of grayscale pixels, it means: sharpness of the object image M1 is sufficient; and the processing unit 120 does not adjust the gain of the image capturing unit 110, the fill light intensity of the fill light unit 130 and the shutter speed of the image capturing unit 110 (step S568). If the number of grayscale pixels of any tangent is greater less than the predetermined number of grayscale pixels, it means: sharpness of the object image M1 is insufficient; and the processing unit 120 enables the image capturing unit 110 to increase its shutter speed (step S569), so as to increase the sharpness of the object image M1 in the driving image F1 captured after the fine-tuning step.

In some embodiment aspects, the predetermined number of grayscale pixels falls within a specific numeric range, say, 0 to 2 (grayscale level/number of pixels), but the present disclosure is not limited thereto.

In conclusion, in step S54 through step S56, the processing unit 120 confirms the image quality of the driving image F1 according to a waveform of the brightness distribution of the object image M1 in the driving image F1 to therefore enable quick feedback and perform fine-tuning accordingly, so as to obtain the driving image F1 with enhanced image quality quickly.

In some embodiments, before performing step S20, the processing unit 120 sets the shutter speed of the image capturing unit 110 such that the driving image F1 captured by the image capturing unit 110 does not blur. Afterward, in step S10 through step S40 of the image capturing method, the processing unit 120 identifies a currently appropriate fill light intensity or gain such that the driving image F1 captured by the image capturing unit 110 has appropriate brightness. Furthermore, given the appropriate shutter speed and fill light intensity or gain, the processing unit 120 performs the fine-tuning operation of step S51 through step S53 or step S54 through step S56 of the image capturing method to further augment the detailed performance of the driving image F1.

In some embodiment aspects, the product of the shutter speed and gain of the image capturing unit 110 and the fill light intensity of the fill light unit 130 before and after the fine-tuning operation of step S53 (or step S56) remains the same. For instance, if the processing unit 120 enables the shutter speed to reduce to a half thereof, the processing unit 120 enables the gain or fill light intensity to double; hence, the product of the shutter speed, gain and fill light intensity is the same before and after the fine-tuning operation.

In some embodiments, the vehicular image pickup device 100 is for use in a detection system of the police forces. For instance, the vehicular image pickup device 100 is mounted on a police car. The vehicular image pickup device 100 is electrically connected to an internal system of the police car, and the internal system sends the captured driving image F1 to a back-end system. The back-end system performs post-processing and image recognition on the driving image F1 and thus assists the police in quickly recording and recognizing license plates and car models. The object image M1 in the driving image F1 is an image of a license plate or an image of the car body. The character images W1 are images of numerals or characters.

In conclusion, a vehicular image pickup device and an image capturing method in the embodiments of the present disclosure adjust a fill light intensity or a gain according to a grayscale quantity distribution of driving images so as to obtain driving images with appropriate brightness, and fine-tune a shutter speed, a fill light intensity or a gain according to a frequency spectrum of the driving images or a brightness distribution of an object image so as to augment the detailed performance of the driving images. Furthermore, the vehicular image pickup device and the image capturing method in the embodiments of the present disclosure dispense with the need to wait for feedback from a back-end system and thus are capable of confirming the image quality of the driving images and performing fine-tuning operation instantly; hence, the driving images of enhanced image quality can be quickly obtained.

Although the present disclosure is disclosed above by preferred embodiments, the preferred embodiments are not restrictive of the present disclosure. Changes and modifications made by persons skilled in the art to the preferred embodiments without departing from the spirit of the present disclosure must be deemed falling within the scope of the present disclosure. Accordingly, the legal protection for the present disclosure should be defined by the appended claims.

What is claimed is:

1. An image capturing method, comprising the steps of:
capturing a driving image by an image capturing unit;
obtaining a grayscale quantity distribution of a plurality of pixels of the driving image on a plurality of grayscale levels;
numbering the pixels sequentially in a direction from a highest grayscale level to a lowest grayscale level among the grayscale levels according to the grayscale quantity distribution until the numbering reaches a predetermined number; and
adjusting a fill light intensity of a fill light unit or a gain of the image capturing unit according to the grayscale level associated with the pixel numbered with the predetermined number;
wherein the grayscale levels are divided into a first grayscale section, a second grayscale section, a third grayscale section and a fourth grayscale section sequentially in the direction from the highest grayscale level to the lowest grayscale level, and the step of adjusting the fill light intensity or the gain further comprises:
decreasing the fill light intensity or the gain if the grayscale level associated with the pixel numbered with the predetermined number falls inside the first grayscale section;
not adjusting the fill light intensity or the gain if the grayscale level associated with the pixel numbered with the predetermined number falls inside the second grayscale section or the fourth grayscale section; and
increasing the fill light intensity or the gain if the grayscale level associated with the pixel numbered with the predetermined number falls inside the third grayscale section.

2. The image capturing method of claim 1, wherein the step of adjusting the fill light intensity or the gain is followed by the steps of:
calculating, by conversion, a frequency spectrum in the driving images;
detecting a frequency domain location in the frequency spectrum; and
fine-tuning a shutter speed and the gain of the image capturing unit or the fill light intensity according to whether any signal appears at the frequency domain location.

3. The image capturing method of claim 2, wherein the step of fine-tuning the shutter speed and the gain or the fill light intensity further comprises:
not adjusting the shutter speed and the gain or the fill light intensity if a signal appears at the frequency domain location; and
increasing the shutter speed and decreasing the fill light intensity or the gain if no signal appears at the frequency domain location.

4. The image capturing method of claim 2, wherein the frequency domain location is obtained according to the number of pixels on a straight line penetrating the driving images and the number of pixels displaying a character image and aligned in the same direction as the straight line.

5. The image capturing method of claim 2, wherein the product of the shutter speed, the gain and the fill light intensity before and after the fine-tuning remains the same.

6. The image capturing method of claim 1, wherein the step of adjusting the fill light intensity or the gain is followed by the steps of:
retrieving an object image from the driving images;
calculating, by conversion, a brightness distribution of the pixels on a straight line penetrating the object image; and
fine-tuning a shutter speed and the gain of the image capturing unit or the fill light intensity according to a waveform of the brightness distribution.

7. The image capturing method of claim 6, wherein the step of fine-tuning the shutter speed and the gain or the fill light intensity further comprises:
comparing a peak-to-peak value of the waveform with a predetermined difference;
not adjusting the gain, the fill light intensity and the shutter speed if the peak-to-peak value is greater than or equal to the predetermined difference; and
increasing the fill light intensity or the gain if the peak-to-peak value is less than the predetermined difference.

8. The image capturing method of claim 7, wherein the step of fine-tuning the shutter speed and the gain or the fill light intensity further comprises:
comparing a crest value of the waveform with a predetermined peak value;
not adjusting the gain or the fill light intensity and the shutter speed if the crest value is greater than or equal to the predetermined peak value; and
increasing the fill light intensity or the gain if the crest value is less than the predetermined peak value.

9. The image capturing method of claim 7, wherein the step of fine-tuning the shutter speed and the gain or the fill light intensity further comprises:
comparing a trough value of the waveform with a predetermined trough value;
decreasing the fill light intensity or the gain if the trough value is greater than the predetermined trough value; and
not adjusting the gain or the fill light intensity and the shutter speed if the trough value is less than or equal to the predetermined trough value.

10. The image capturing method of claim 6, wherein the step of fine-tuning the shutter speed and the gain or the fill light intensity further comprises:
not adjusting the shutter speed, the gain and the fill light intensity if the number of grayscale pixels of each tangent of the waveform is less than a predetermined number of grayscale pixels; and
increasing the shutter speed if the number of grayscale pixels of any said tangent of the waveform is greater than the predetermined number of grayscale pixels.

11. A vehicular image pickup device, comprising:
an image capturing unit for capturing a driving image;
a fill light unit for providing a fill light; and
a processing unit for obtaining a grayscale quantity distribution of a plurality of pixels of the driving image on a plurality of grayscale levels, numbering the pixels sequentially in a direction from a highest grayscale level to a lowest grayscale level among the grayscale levels according to the grayscale quantity distribution until the numbering reaches a predetermined number, and adjusting a fill light intensity of the fill light unit or a gain of the image capturing unit according to the grayscale level of the pixel whose number is the predetermined number
wherein the grayscale levels are divided into a first grayscale section, a second grayscale section, a third grayscale section and a fourth grayscale section sequentially in the direction from the highest grayscale level to the lowest grayscale level, allowing the processing unit to decrease the fill light intensity or the gain if the grayscale level associated with the pixel numbered with the predetermined number falls inside the first grayscale section, not to adjust the fill light intensity or the gain if the grayscale level associated with the pixel numbered with the predetermined number falls inside the second grayscale section or the fourth grayscale section, and to increase the fill light intensity or the gain if the grayscale level associated with the pixel numbered with the predetermined number falls inside the third grayscale section.

12. The vehicular image pickup device of claim 11, wherein, after adjusting the fill light intensity or the gain, the processing unit calculates, by conversion, a frequency spectrum in the driving images, detects a frequency domain location in the frequency spectrum, and fine-tunes a shutter speed and the gain of the image capturing unit or the fill light intensity according to whether any signal appears at the frequency domain location.

13. The vehicular image pickup device of claim 12, wherein the processing unit does not adjust the shutter speed and the gain or the fill light intensity if a signal appears at the frequency domain location, increases the shutter speed and decreases the fill light intensity or the gain if no signal appears at the frequency domain location.

14. The vehicular image pickup device of claim 12, wherein the processing unit obtains the frequency domain location according to the number of pixels on a straight line penetrating the driving images and the number of pixels displaying a character image and aligned in the same direction as the straight line.

15. The vehicular image pickup device of claim 12, wherein the product of the shutter speed, the gain and the fill light intensity before and after the fine-tuning remains the same.

16. The vehicular image pickup device of claim 11, wherein, after adjusting the fill light intensity or the gain, the processing unit retrieves the object image from the driving images, calculates, by conversion, a brightness distribution of the pixels on a straight line penetrating the object image, and fine-tunes a shutter speed and the gain of the image capturing unit and/or the fill light intensity according to a waveform of the brightness distribution.

17. The vehicular image pickup device of claim 16, wherein the step of fine-tuning the gain or the fill light intensity and the shutter speed according to a waveform of the brightness distribution further comprises: comparing a peak-to-peak value of the waveform with a predetermined difference; not adjusting the shutter speed or the gain and the fill light intensity if the peak-to-peak value is greater than or equal to the predetermined difference; and increasing the fill light intensity or the gain if the peak-to-peak value is less than the predetermined difference.

18. The vehicular image pickup device of claim 17, wherein the step of fine-tuning the gain or the fill light intensity and the shutter speed according to a waveform of the brightness distribution further comprises: comparing a crest value of the waveform with a predetermined peak value; not adjusting the gain or the fill light intensity and the shutter speed if the crest value is greater than or equal to the predetermined peak value; and increasing the fill light intensity or the gain if the crest value is less than the predetermined peak value.

19. The vehicular image pickup device of claim 17, wherein the step of fine-tuning the gain or the fill light intensity and the shutter speed according to the waveform of the brightness distribution further comprises: comparing a trough value of the waveform with a predetermined trough value; decreasing the fill light intensity or the gain if the trough value is greater than the predetermined trough value; and not adjusting the gain or the fill light intensity and the shutter speed if the trough value is less than or equal to the predetermined trough value.

20. The vehicular image pickup device of claim 16, wherein the processing unit does not adjust the shutter speed, the gain and the fill light intensity if the number of grayscale pixels of each tangent of the waveform is less than a predetermined number of grayscale pixels, and the processing unit increases the shutter speed if the number of grayscale pixels of any said tangent of the waveform is greater than the predetermined number of grayscale pixels.

21. An image capturing method, comprising the steps of:
capturing a driving image by an image capturing unit;
obtaining a grayscale quantity distribution of a plurality of pixels of the driving image on a plurality of grayscale levels;
numbering the pixels sequentially in a direction from a highest grayscale level to a lowest grayscale level among the grayscale levels according to the grayscale quantity distribution until the numbering reaches a predetermined number, wherein the predetermined number corresponds to a number of pixels of a predetermined size of an object image to be detected in the driving image, and wherein the object image is a subset of pixels contained within the driving image; and
adjusting a fill light intensity of a fill light unit or a gain of the image capturing unit according to the grayscale level associated with the pixel numbered with the predetermined number.

22. The image capturing method of claim 21, wherein the grayscale levels are divided into a first grayscale section, a second grayscale section, a third grayscale section and a fourth grayscale section sequentially in the direction from the highest grayscale level to the lowest grayscale level, and the step of adjusting the fill light intensity or the gain further comprises:
decreasing the fill light intensity or the gain if the grayscale level associated with the pixel numbered with the predetermined number falls inside the first grayscale section;
not adjusting the fill light intensity or the gain if the grayscale level associated with the pixel numbered with the predetermined number falls inside the second grayscale section or the fourth grayscale section; and
increasing the fill light intensity or the gain if the grayscale level associated with the pixel numbered with the predetermined number falls inside the third grayscale section.

* * * * *